ELIJAH CULP.
Corn Harvester and Shocker.
No. 120,249. Patented Oct. 24, 1871.
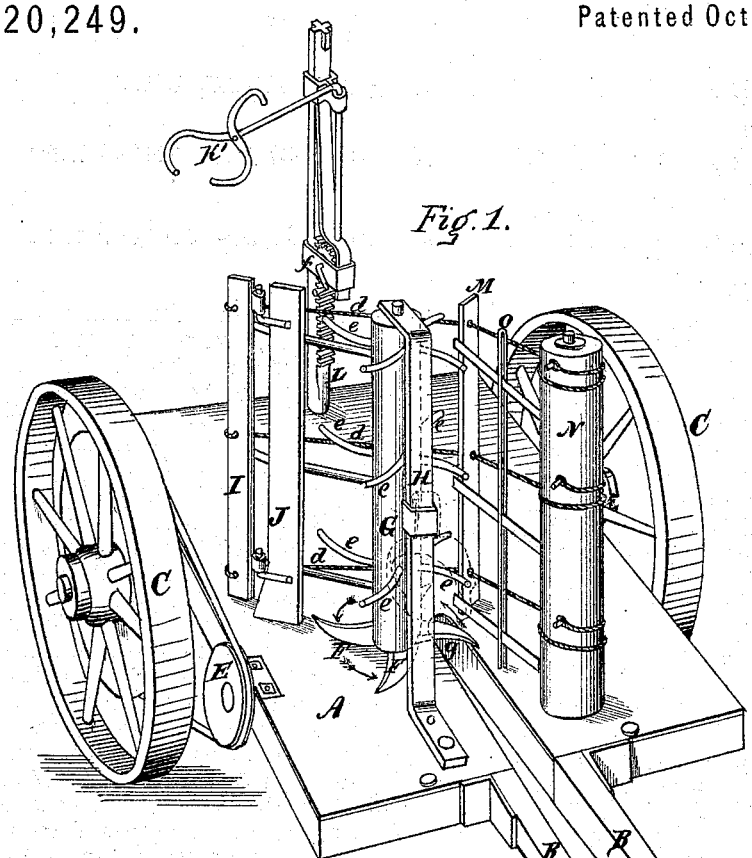
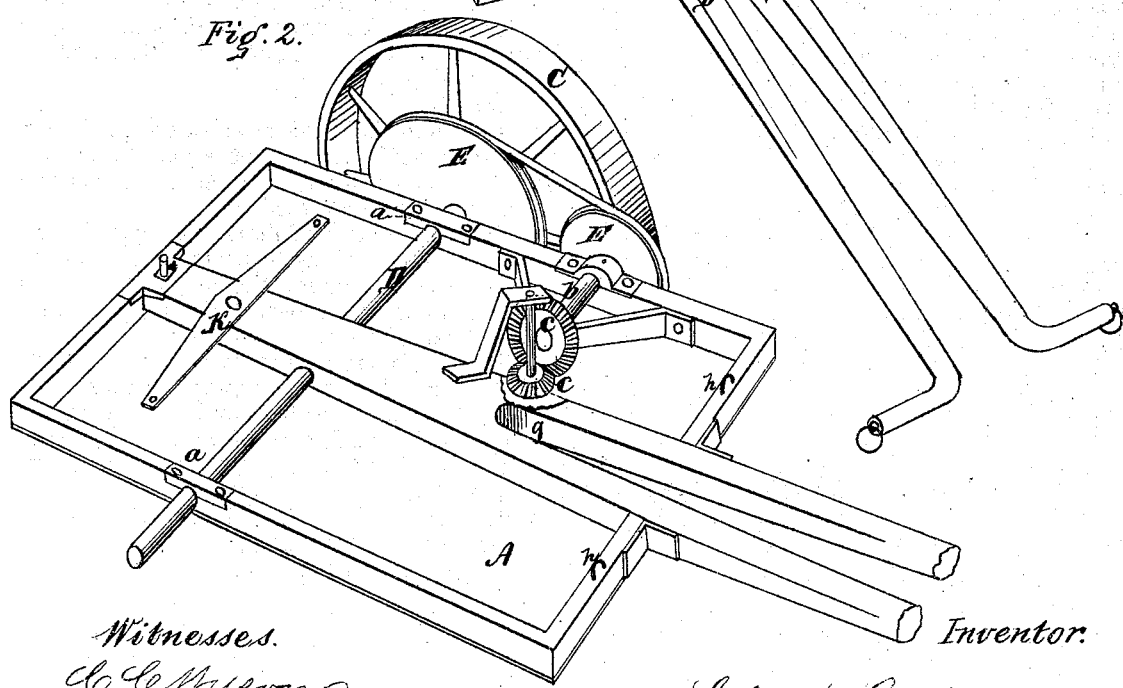

UNITED STATES PATENT OFFICE.

ELIJAH CULP, OF HILLIARD STATION, OHIO.

IMPROVEMENT IN CORN-HARVESTERS AND SHOCKERS.

Specification forming part of Letters Patent No. 120,249, dated October 24, 1871.

*To all whom it may concern:*

Be it known that I, ELIJAH CULP, of Hilliard Station, in the county of Franklin and State of Ohio, have invented certain Improvements in Machines for Cutting and Shocking Corn and Cane, of which the following is a specification:

The first and second parts of my invention relate to a combination of devices for collecting the cut stalks of corn from the sickle into a perpendicular position for forming a shock of corn on the machine. The third part of my invention relates to a combination of devices, hereinafter more specifically described.

Figure 1 is a perspective view of a machine embodying my invention. Fig. 2 is an inverted view of a machine, showing the connection of movement.

A is the body or bed of the machine. B B is the forked tongue, on the outer sides of which are hitched the horses that draw the machine over the row of standing corn or cane, bringing the stalks within the forked tongue and to the point *g*, where they are severed by the circular sickle F. The horses draw the machine by being hitched to single-trees attached to iron rods passing through the loops *h h* back to the double-tree K on under side of the machine. C C are the propelling-wheels, which are fastened permanently to the axle D, which axle revolves in boxes at the points *a a*. E E are band-wheels, (cog-wheels may be used,) which communicate the movement from the propelling-wheels through the shaft *b* and wheels *c c* to the circular sickle F and gathering-shaft G, causing the same to revolve in the direction indicated by the arrows. The gathering-shaft is provided on its outer surface, at regular intervals, with a series of curved arms, indicated by the letter *e*, which, as the shaft revolves, forces the stalks into the receptacle provided for them, and consisting of the cords *d d d* and shocker-gate I. The shocker-gate is hung on hinges to the rear guard J, and can be lifted off and swung around clear of the stalks of corn or cane after they are clamped by the circular tongs K attached to the crane L, which said tongs are raised or lowered, as occasion may require, by means of a ratchet-wheel at the point *f*. The cords *d d d* pass from the shocker-gate through the post M, which keeps them in position to the cylinder N, which is provided with a coiled spring on its inside, permitting it to revolve just sufficiently to keep the cords tightened so as to hold the stalks in an upright position as they are pressed backward by the gathering-shaft. The gathering-shaft is held in its position by means of the brace H, which also can be made to support the seat for the driver. The rear guard J is provided with arms to prevent the stalks from escaping in the rear of the gathering-shaft as they are being pressed back against the cords. The front guard O is also provided with arms to keep the stalks from escaping the gathering-shaft.

When a sufficient quantity of stalks is accumulated within the cords to make a shock the tongs of the crane are lowered and passed around the stalks, compressing them so as to be easily bound, the shocker-gate is removed, and, by means of the crane, the shock is lifted and set off the machine.

I claim—

1. The combination of the shocker-gate I, cords *d*, and spring-cylinder N, for the purpose of holding the stalks of corn in a perpendicular position till the shock is completed.

2. The combination of the shocker-gate I, cords *d*, spring-cylinder N, and gathering-shaft G for the purpose of collecting the cut stalks of corn from the sickle into a perpendicular position to form a shock of corn.

3. The combination and arrangement of the forked tongue B, center-cutting circular sickle F, shocker-gate I, spring-cylinder N, front and rear guards O and J, cords *d*, and ratchet-crane L and tongs K', substantially as and for the purpose specified.

ELIJAH CULP.

Witnesses:
ALEX. H. FRITCHEY,
JOEL C. WHITE.

(75)